(12) United States Patent
Biskeborn et al.

(10) Patent No.: US 7,990,659 B2
(45) Date of Patent: Aug. 2, 2011

(54) MAGNETIC HEAD WITH PROTECTIVE FILMS

(75) Inventors: Robert Glenn Biskeborn, Hollister, CA (US); Calvin Shyhjong Lo, Saratoga, CA (US); Jason Liang, Campbell, CA (US); Teya Topuria, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 11/775,158

(22) Filed: Jul. 9, 2007

(65) Prior Publication Data

US 2009/0015970 A1    Jan. 15, 2009

(51) Int. Cl.
*G11B 5/39* (2006.01)
*G11B 5/11* (2006.01)

(52) U.S. Cl. ............. 360/319; 360/320; 360/324.12

(58) Field of Classification Search .......... 360/319, 360/320, 324.1, 324.11, 324.12, 324.2
See application file for complete search history.

(56) References Cited

U.S. PATENT DOCUMENTS

| | | | |
|---|---|---|---|
| 5,917,681 A * | 6/1999 | Okada et al. ............... 360/320 |
| 5,992,004 A | 11/1999 | Sato et al. ............... 29/603.14 |
| 6,301,089 B1 | 10/2001 | Saito et al. ............... 360/324.12 |
| 6,307,722 B1 | 10/2001 | Sato et al. ............... 360/324.12 |
| 6,411,476 B1 * | 6/2002 | Lin et al. ............... 360/324.11 |
| 6,414,825 B1 | 7/2002 | Inoue et al. ............... 360/320 |
| 6,697,234 B2 * | 2/2004 | Koike ............... 360/319 |
| 6,721,147 B2 | 4/2004 | Aoshima et al. ............... 360/324.12 |
| 7,016,165 B2 | 3/2006 | Chien et al. ............... 360/324.12 |
| 7,209,327 B2 * | 4/2007 | Ookawa et al. ............... 360/324.12 |
| 2002/0191352 A1 * | 12/2002 | Nakamoto et al. ............... 360/319 |
| 2003/0072105 A1 | 4/2003 | Ueda et al. ............... 360/126 |
| 2004/0190206 A1 * | 9/2004 | Ookawa et al. ............... 360/324.12 |
| 2006/0152863 A1 * | 7/2006 | Freitag et al. ............... 360/324.12 |
| 2007/0035888 A1 * | 2/2007 | Sbiaa et al. ............... 360/324.1 |

FOREIGN PATENT DOCUMENTS

JP    2005-123412    5/2005

OTHER PUBLICATIONS

Pinarbasi, Mustafa "High Coercivity Multifilm Hard Magnetic Layer For Magnetically Stabilizing A Spin Valve Sensor" IBM Dossier, p. 1-4, 1998.

* cited by examiner

*Primary Examiner* — Jefferson Evans
(74) *Attorney, Agent, or Firm* — Zilka-Kotab, PC (57) ABSTRACT

A magnetic head according to one embodiment includes a substrate; a sensor formed above the substrate; a second shield formed above the sensor and the substrate; a first insulation layer positioned between the substrate and the sensor; a second insulation layer positioned between the sensor and the second shield; and a nonmagnetic, non-electrically insulative layer formed between the substrate and the sensor.

18 Claims, 7 Drawing Sheets

MAGNETIC HEAD WITH PROTECTIVE FILMS

FIELD OF THE INVENTION

The present invention relates to magnetic heads, and more particularly, this invention relates to a magnetic head having at least one protective film formed of a nonmagnetic, non-electrically insulative layer.

BACKGROUND

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. Data storage density can be increased because AMR and GMR sensors offer signal levels higher than those available from conventional inductive read heads for a given read sensor width and so enable smaller reader widths and thus more tracks per inch. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

One problem frequently encountered during reading and writing to tape is that metal particles or fragments of media coatings can come loose from the tape and adhere to the head, leading to formation of metallic bridges on the head. Another problem is formation of metallic bridges via electrostatic and/or electrochemical interaction with the head and involving the tape. Read sensors are particularly susceptible to failure due to shield-shorting as a result of bridging. Conductive bridging appears to occur predominantly in low humidity conditions, e.g., less than about 20-25% relative humidity, depending on the media formulation. Such low humidity conditions are typical with the current prevalence of air conditioned server rooms and business places. It is also believed that tapes having surface resistivities above approximately $10^6$ ohm-cm may aggravate and accelerate the growth of the bridges.

One of the problematic modes is the formation of iron-cobalt bridges that short a lower (S1) shield, which may be nickel iron, Sendust, etc. as is commonly used in tape heads, to the hard bias magnet trim, typically formed of CoPt. The bridges are believed to form from the interaction of Fe and/or Co in the tape with Fe in the shield and Co in the hard bias magnet. Running tape appears to initiate bridge formation. Further, electric fields in the insulation layer between the S1 shield and hard bias magnet film are typically 10-12 volts/micrometer. This large field can drive galvanic corrosion and/or electrostatic deposition.

The only known solutions to the bridging problem are to recess the sensor so that its components do not make electrical contact with the conductive accumulation, coat the head with a durable wear coating, providing wear fences for otherwise non-fenced readers, and/or adjust drive voltages. One apparently reliable means is prerecessing the sensor and applying a coating to the recessed section, but this requires several post wafer machining steps, and so adds cost. Such a method also may produce an undesirable spacing loss. Further, the coating may wear off over time, even with pre-recession.

SUMMARY OF THE INVENTION

A magnetic head according to one embodiment includes a substrate; a sensor formed above the substrate; a second shield formed above the sensor and the substrate; a first insulation layer positioned between the substrate and the sensor; a second insulation layer positioned between the sensor and the second shield; and a nonmagnetic, non-electrically insulative layer formed between the substrate and the sensor.

A magnetic head according to another embodiment includes a substrate; a first shield formed above the substrate; a sensor formed above the first shield and the substrate; a second shield formed above the sensor and the substrate; a first insulation layer positioned between the first shield and the sensor; a second insulation layer positioned between the sensor and the second shield; and a nonmagnetic, non-electrically insulative layer formed between at least one of the shields and the sensor, wherein the sensor comprises a read transducer flanked by hard bias layers, wherein the nonmagnetic, non-electrically insulative layer has a width that is substantially coextensive with widths of the hard bias layers of the sensor.

A magnetic head in yet another embodiment includes a substrate; a sensor formed above the substrate; a first shield formed between the sensor and substrate; and a second shield formed above the sensor and substrate, wherein at least one of the first shield and the second shield is a laminate structure comprising layers of a magnetic material and layers of a nonmagnetic, non-electrically insulative layer.

A magnetic head according to yet another embodiment includes a pair of write poles; and a nonmagnetic, non-electrically insulative layer formed between the write poles.

Any of these embodiments may be implemented in a magnetic data storage system such as a tape drive system, which may include a magnetic head as recited above, a drive mechanism for passing a magnetic medium (e.g., recording tape) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

In one general embodiment, a magnetic head includes a substrate, optionally a first shield formed above the substrate, a sensor formed above the substrate and optional first shield, a second shield formed above the sensor, a first insulation layer positioned between the substrate and the sensor (preferably between the sensor and the optional first shield if present), a second insulation layer positioned between the sensor and the second shield, and a nonmagnetic, non-electrically insulative layer such as a refractory metal layer formed between the substrate and the sensor. Additional layers and/or components may or may not be present.

In another general embodiment a magnetic head includes a substrate, a sensor formed above the substrate, a first shield formed between the sensor and substrate, and a second shield formed above the sensor, wherein at least one of the first shield and the second shield is a laminate structure comprising layers of a magnetic material and layers of a nonmagnetic, non-electrically insulative material such as a refractory metal. Additional layers and/or components may or may not be present.

In variations of the above embodiments, a first shield is not present; rather the substrate, e.g., of ferrite, may act as the shield. The various other layers may be in about the same locations set forth above relative to the substrate.

The nonmagnetic, non-electrically insulative film or films are preferably deposited at shorting sensitive locations in the head. These locations include, but are not restricted to, the gap between lower shield and sensor, the gap between lower shield and sensor leads, and similarly for the gaps between upper shield and sensor and leads. The nonmagnetic, non-electrically insulative layers, or laminates thereof, may also be formed in the write gap between the write poles.

The inventors have surprisingly and unexpectedly discovered that the addition of the nonmagnetic, non-electrically insulative layer strongly inhibits the formation of conductive bridges between the hard bias layer, leads, and/or shields. SEM and TEM analysis of debris accumulations on tape heads confirmed that conductive bridges generally do not form between a CoPt hard bias layer and the upper shield when the CoPt hard bias layer is capped with Ta as part of the lead structure. Refractory metal layers are particularly effective. Ta appears to prevent the formation in the hard bias-upper shield path. This is believed to be because the hard bias layer was capped with a relatively thick (>700 Å) tantalum as part of the lead structure, and so the Ta interrupted the pathway between the hard bias layers and the upper shield.

While the following description will be described in terms of a tape storage system for clarity and to place the invention in context, it should be kept in mind that the teachings herein may have broad application to all types of magnetic recording, including hard disk drive heads.

Figure 1:
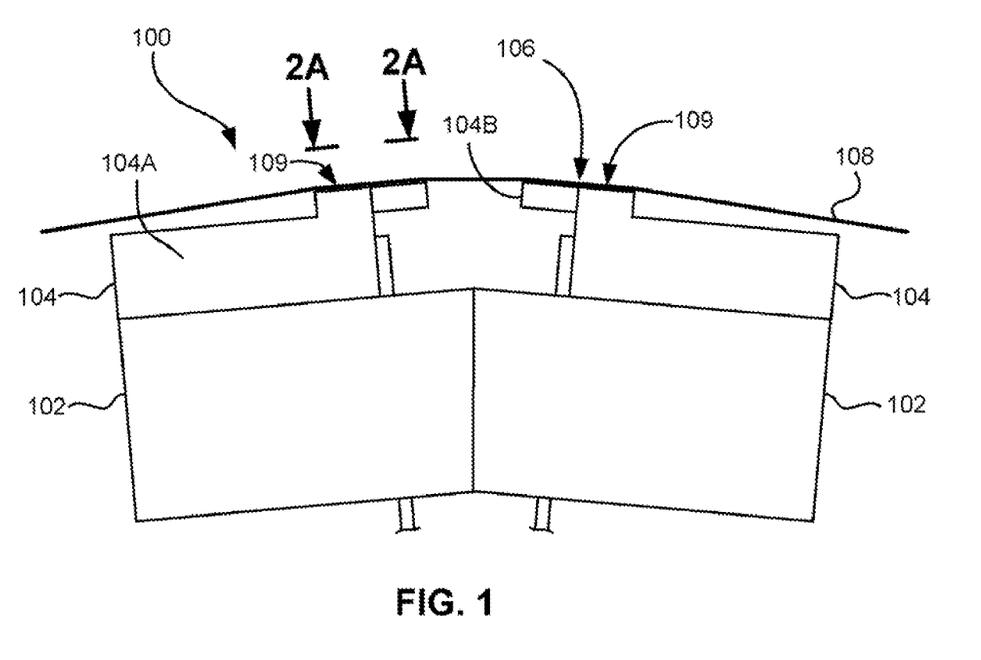
FIG. 1 illustrates a flat-lapped magnetic tape head according to one embodiment of the present invention.

FIG. 1 illustrates a flat-lapped bi-directional, two-module magnetic tape head 100, in accordance with one embodiment of the present invention. As shown, the head includes a pair of bases 102, each equipped with a module 104. The bases may be "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Figure 2A:
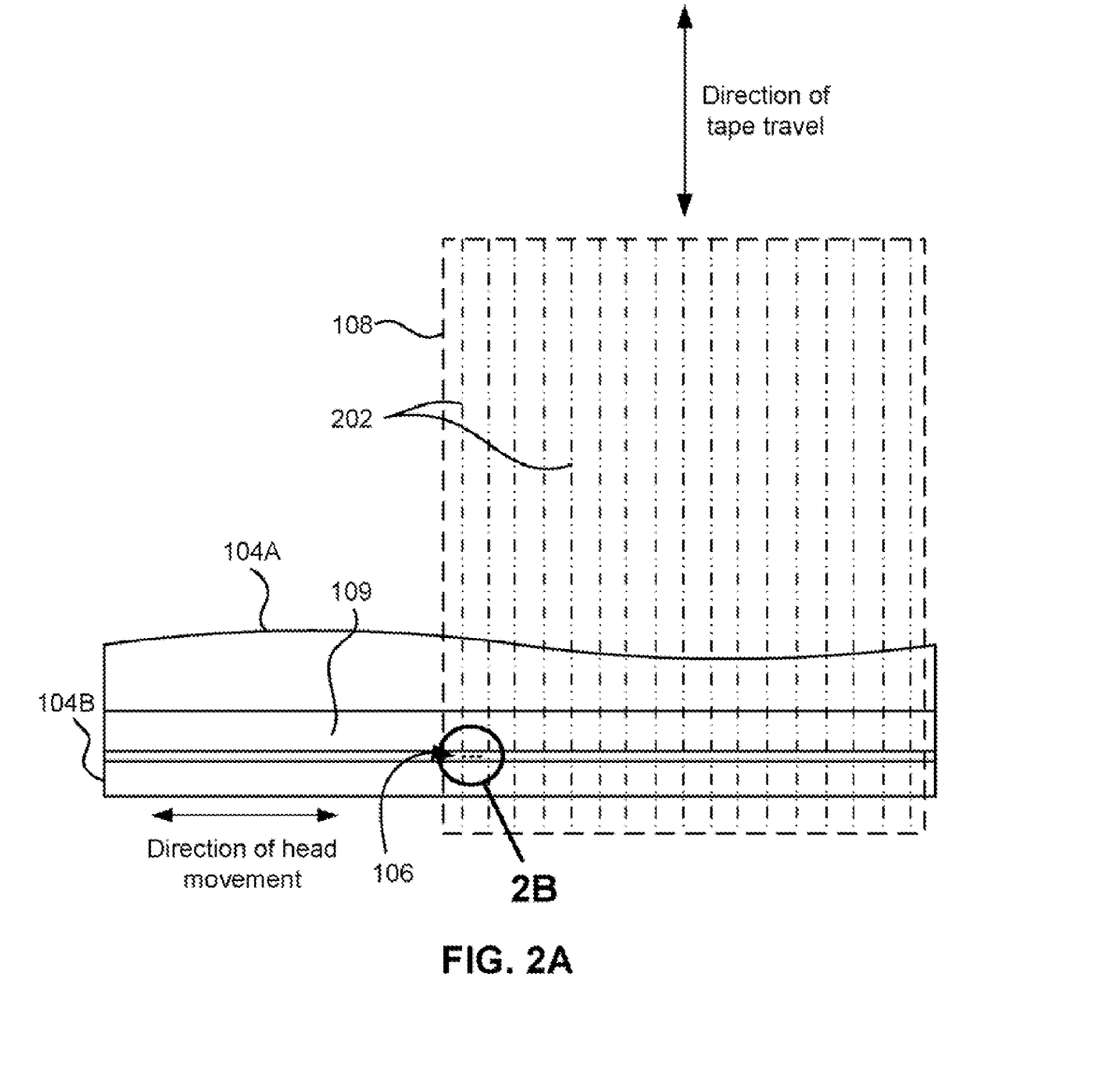
FIG. 2A is a tape bearing surface view taken from Line 2A-2A of FIG. 1.

FIG. 2A illustrates the tape bearing surface 109 of one of the modules 104. A representative tape 108 is shown in dashed lines. The module is long enough to support the tape as the head steps between data bands. The data bands are defined between servo tracks 202. Each data band may include a number of data tracks, for example 96 data tracks (not shown). During read/write operations, the transducers 106 are positioned within one of the data bands. Outer readers, sometimes called servo readers, read the servo tracks 202. The servo signals are used to keep the transducers 106 aligned with the tracks during the read/write operations. Typically, a coarse positioner (worm gear, etc.) places the head generally adjacent a given group of data tracks, then a fine positioner (voice coil, etc.) keeps the heads aligned using the servo tracks. Alternatively, both functions may be combined into a single voice coil positioner.

Figure 2B:
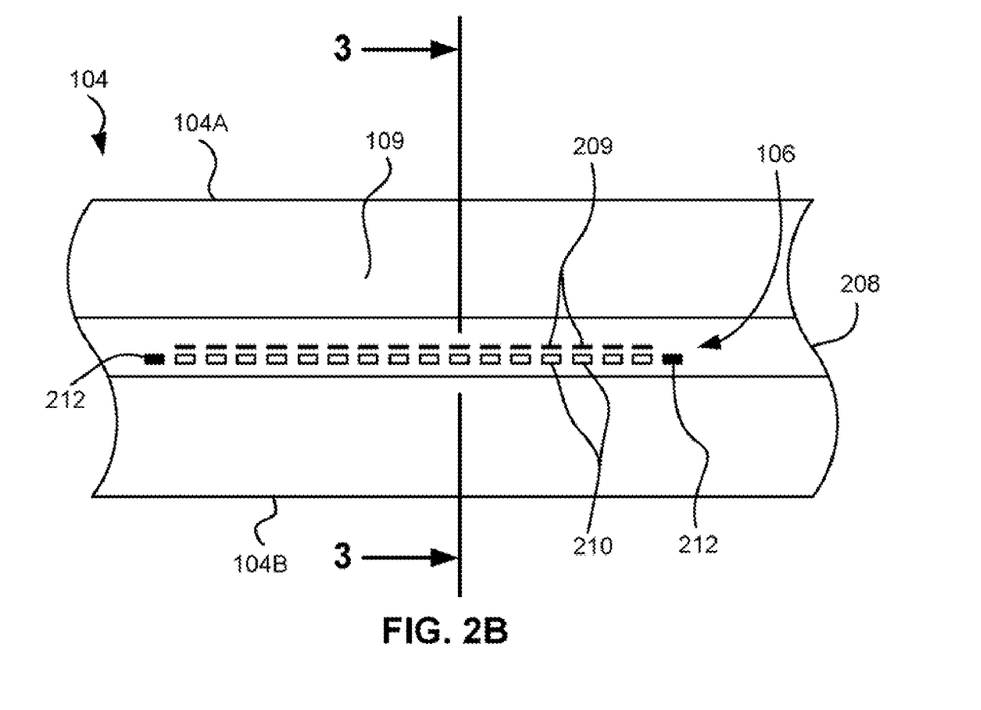
FIG. 2B is a detailed view taken from Circle 2B of FIG. 2A.

FIG. 2B depicts a plurality of read and/or write transducers 106 formed in a gap 208 on the module 104 of FIG. 2A. As shown, the array of transducers 106 includes, for example, 16 writer transducers or "writers" 209, 16 read transducers or "readers" 210 and two servo readers 212, though the number of transducers may vary. Illustrative embodiments include 8, 16, 24, 32, and 40 transducers per array 106. A preferred embodiment includes 24 readers per array and/or 24 writers per array. This large number of channels allows the tape to travel more slowly for a give net data rate, thereby reducing speed-induced tracking and mechanical difficulties. While the readers and writers may be arranged in a piggyback configuration as shown in FIG. 2B, the readers 210 and writers 209 may also be arranged in an interleaved configuration. Alternatively, each array of transducers 106 may be readers or writers only, and the arrays may contain one or more servo readers. As noted by considering FIGS. 1 and 2A-B together, each module 104 may include a complementary set of transducers 106 for such things as bi-directional reading and writing, read-while-write capability, etc.

In other embodiments, the head may have a tape bearing surface shaped other than flat. For example, the teachings herein are equally applicable to heads having a rounded or arcuate tape bearing surface.

Figure 3:
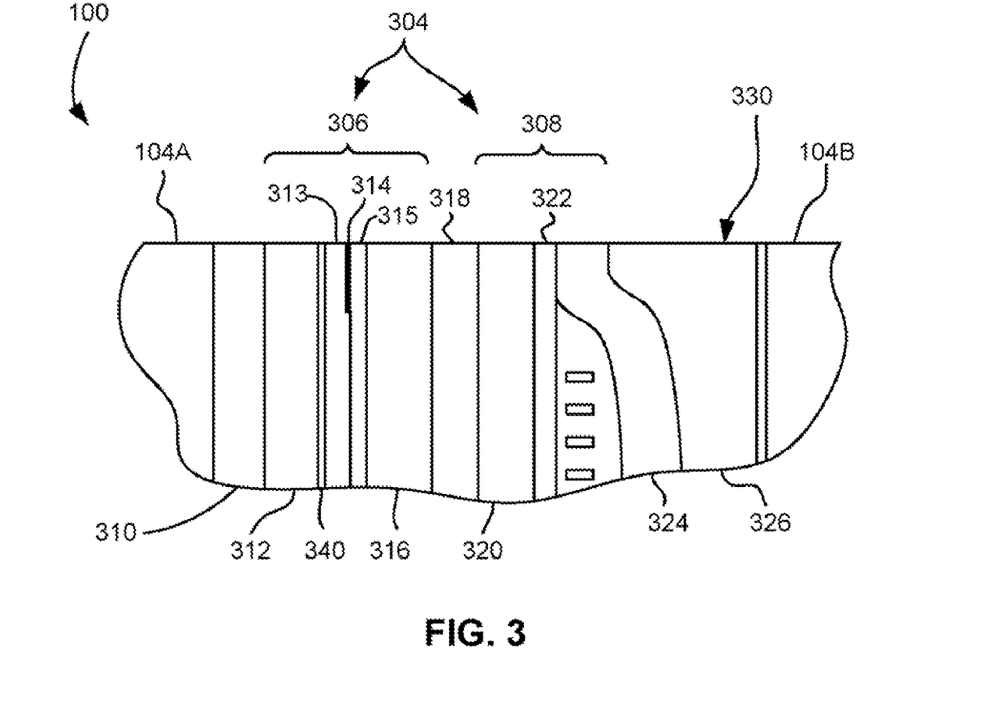
FIG. 3 is a partial cross sectional view of a magnetic head taken along Line 3 of FIG. 2B according to one embodiment of the present invention.

FIG. 3 illustrates the cross section of the magnetic head 100 of FIG. 2B. As shown, the magnetic head includes a substrate 104A. One or more transducers 304 are formed above the substrate. In the embodiment shown, the transducers 304 include a reader 306 and writer 308 in a "piggyback" configuration. However, in other embodiments, only readers may be present, or both readers and writers may be present but in a different configuration such as writer-formed-first, an offset (misaligned) configuration, interleaved configuration, etc.

In the embodiment shown in FIG. 3, the various layers formed above the substrate 104A may include an undercoat portion 310, a first shield 312, a second shield 316, a sensor 314 formed between the shields 312, 316, a first insulation layer 313 formed between the first shield and the sensor 314, a second insulation layer 315 positioned between the sensor and the second shield 316, a third insulation layer 318 formed above the second shield 316, a lower write pole 320, a write gap layer 322, an upper write pole 324, and an overcoat portion 326. Note that in variations and permutations of the present invention, layers may be added or removed. For instance, the second shield 316 and lower write pole 320 may be merged into a single layer or bi-layer. Further, the writer 308 and associated layers may be absent. The media-proximal surface 330 can generally be defined as the surface which faces the magnetic medium during use of the head in conjunction with reading from or writing to the medium. The media-proximal surface 330 may or may not be the lapped surface defined upon lapping of the structure from the wafer.

Except as noted herein, the various layers 310-326 may be formed of conventional materials known in the art, and by conventional processes known in the art. Typically, the substrate 302 may be formed of AlTiC or a silicon-containing material. The undercoat 310 and insulation layers 313, 315, 318 may be formed of an electrically insulative material such as alumina. The overcoat portion 326 is formed of sputtered alumina or other electrically insulative material. The write poles 320, 324 are typically formed of an iron alloy such as nickel iron, cobalt iron, etc. One preferred material for the write poles 320, 324 is plated 45/55 nickel/iron alloy.

As noted above, accumulations of debris on the head 100 can create conductive bridges that create shorts between the sensor 314 and the shields 312, 316. Particularly prevalent is shorting between the shields 312, 316 and the hard bias layers of the sensor 314. The inventors have found that adding a nonmagnetic, non-electrically insulative layer, and especially a layer of refractory metal, between the sensor and a shield reduces, and may eliminate, bridging of debris therebetween.

Accordingly, in some embodiments of the present invention, a nonmagnetic, non-electrically insulative layer 340 is formed between the first and/or second shield and the sensor. The nonmagnetic, non-electrically insulative layer may typically have an electrical resistivity of less than about $1 \times 10^{10}$ ohm·m, preferably less than about $1 \times 10^{8}$ ohm·m. The nonmagnetic, non-electrically insulative layers 340 may be formed of a refractory metal (preferably substantially pure), as well as an alloy of refractory metals or an alloy of refractory and nonrefractory metals. Illustrative refractory metals are Tungsten (W), Titanium (Ti), Molybdenum (Mo), Niobium (Nb), Tantalum (Ta), and Rhenium (Re). In other embodiments, the nonmagnetic, non-electrically insulative layer may be present with several additional nonmagnetic, non-electrically insulative layers and several other layers to form a laminate structure.

Those skilled in the art will appreciate that the particular number and location of the various layers and laminates presented herein are provided by way of example only, and that various permutations and combinations of such layers and/or their placement are contemplated by the present description.

Figure 4:
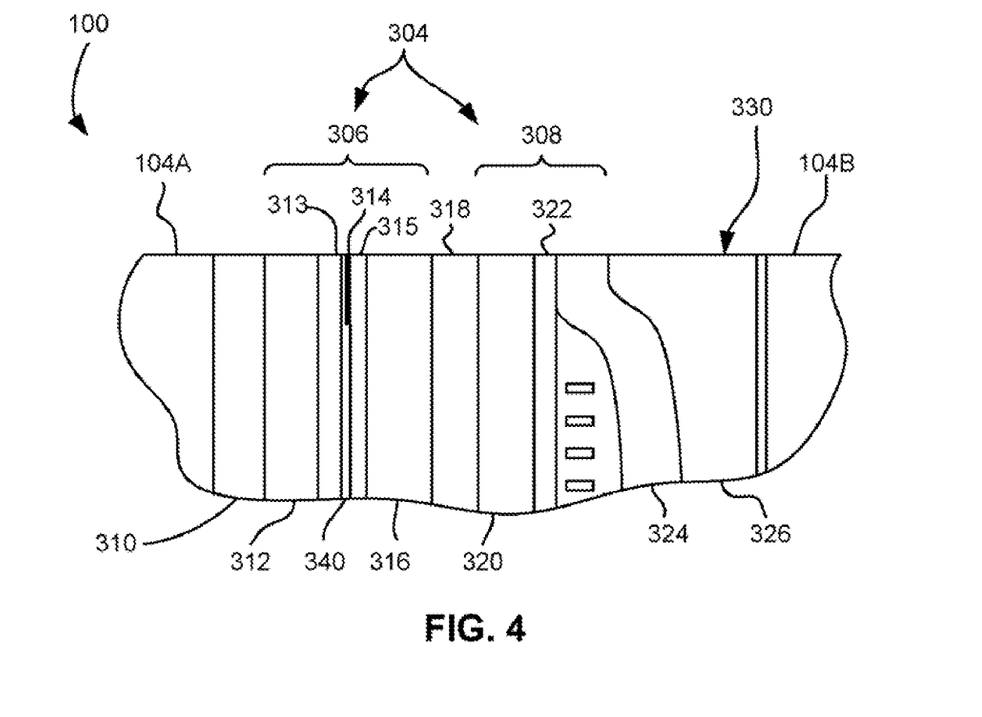
FIG. 4 is a partial cross sectional view of a magnetic head according to one embodiment of the present invention.

In one approach, a nonmagnetic, non-electrically insulative layer 340 is positioned between the first shield 312 and the sensor 314. For example, in the embodiment shown in FIG. 3, the nonmagnetic, non-electrically insulative layer 340 is positioned between the first shield 312 and the first insulation layer 313. Referring to FIG. 4, the nonmagnetic, non-electrically insulative layer 340 is positioned between the sensor 314 and the first insulation layer 313. In either embodiment, electrically insulative layers (not shown) may be present to isolate the nonmagnetic, non-electrically insulative layer 340 from the first shield 312 or the sensor 314. Where the nonmagnetic, non-electrically insulative layer 340 is deposited onto the bottom shield as in FIG. 3, it forms part of the read gap. Accordingly, the first insulation layer 313 may be made thinner by the thickness of the nonmagnetic, non-electrically insulative layer 340 to maintain the same total magnetic spacing between the first shield 312 and sensor 314.

Figure 5:
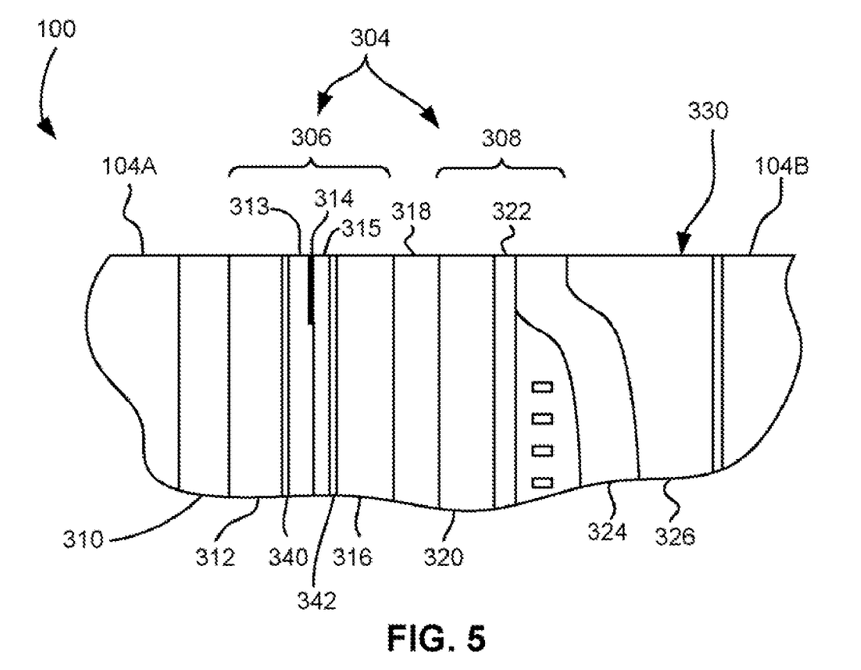
FIG. 5 is a partial cross sectional view of a magnetic head according to one embodiment of the present invention.

Referring to FIG. 5, which is a variation of the embodiment of FIG. 3, a second nonmagnetic, non-electrically insulative layer 342 may be positioned at any location between the sensor 314 and the second shield 316. For example, tantalum as an example may be deposited on top of the second insulation layer 315, and again insulation thickness may be adjusted to keep the design overall magnetic gap thickness. In this case the second shield 316, which may be permalloy, is protected against ductile plowing into the sensor 314, with the benefit that heads so constructed may not need surface sputtering protection.

Note that, the described "second nonmagnetic, non-electrically insulative layer" is meant to encompass not only a second nonmagnetic, non-electrically insulative layer adjacent to or spaced from the sensor, but also a second nonmagnetic, non-electrically insulative layer 342 added to the sensor 314 itself as a cap layer and/or to form the leads, even though such layers might be considered to be integral portions of the sensor structure. In other words, the second nonmagnetic, non-electrically insulative layer 342 in some embodiments is considered to be between the sensor 314 and the second shield 316, even if such layer is in actuality also considered to be a layer of the sensor itself. Again, variations are contemplated. Further variations include only the second refractory layer 342 and not layer 340, the second refractory layer 342 positioned as shown and the refractory layer 340 positioned towards the sensor 314, etc.

Figure 6:
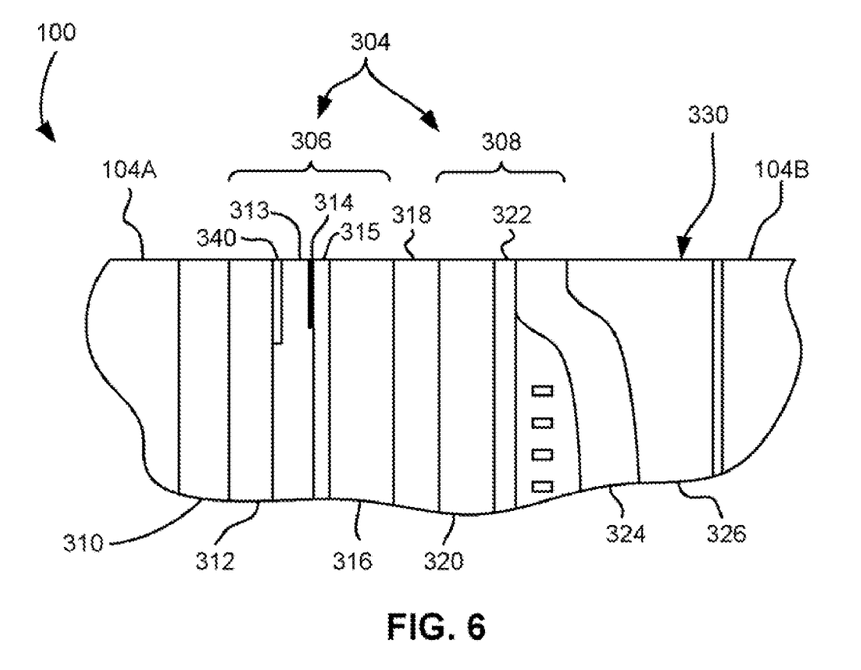
FIG. 6 is a partial cross sectional view of a magnetic head according to one embodiment of the present invention.

FIG. 6 illustrates yet another variation in which the nonmagnetic, non-electrically insulative layer 340 has a reduced height. This embodiment shows that the nonmagnetic, non-electrically insulative layer 342 need not extend for the full height of the thin film structure, but may merely extend back from the media proximal surface 330 for a shorter relative distance. Again, by being present at the media proximal surface 330, the nonmagnetic, non-electrically insulative layer 340 operates to reduce the formation of conductive bridges. As in the other embodiments described herein, the nonmagnetic, non-electrically insulative layer 340 may be formed just in the area of the hard bias layers.

Note that a similar structure may also or alternatively be present in a recess in the second shield layer 316. The nonmagnetic, non-electrically insulative layer 340 may be chemical-mechanical polishing (CMP) planarized prior to the deposition of the first insulation layer 313.

Laminate structures incorporating layers of nonmagnetic, non-electrically insulative layers may be used instead of thicker layers of nonmagnetic, non-electrically insulative materials. Such a laminate structure may incorporate other functional layers, e.g., insulating layers, shielding layers, etc., and may even be used to provide a desired functionality in the head such as electrical isolation.

Figure 7:
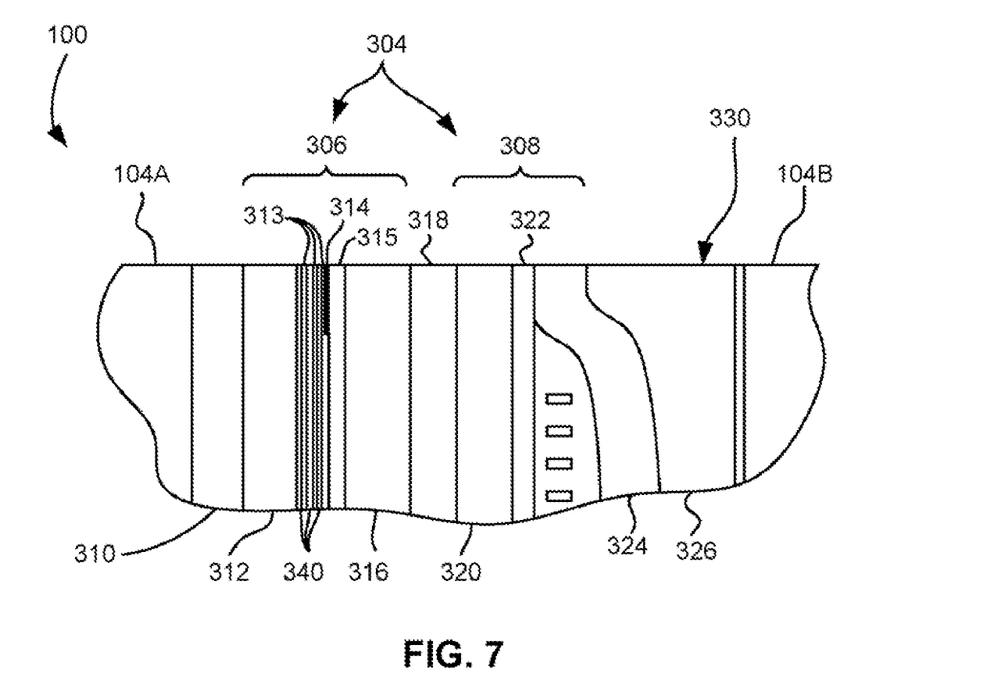
FIG. 7 is a partial cross sectional view of a magnetic head according to one embodiment of the present invention.

For example, FIG. 7 depicts an embodiment in which the nonmagnetic, non-electrically insulative layer 340 is present with several additional nonmagnetic, non-electrically insulative layer s 340 and several additional first insulating layers 313, thereby forming a laminate structure. An illustrative structure may be as follows: Ta/AlOx/Ta/AlOx/ . . . . The insulating layers in the laminate isolate the sensor 314 from the first shield 312. The second and third insulating layers 315, 318 may also or alternatively be formed of a laminate structure. An insulating layer of the laminate is preferably positioned adjacent the sensor.

Figure 8:
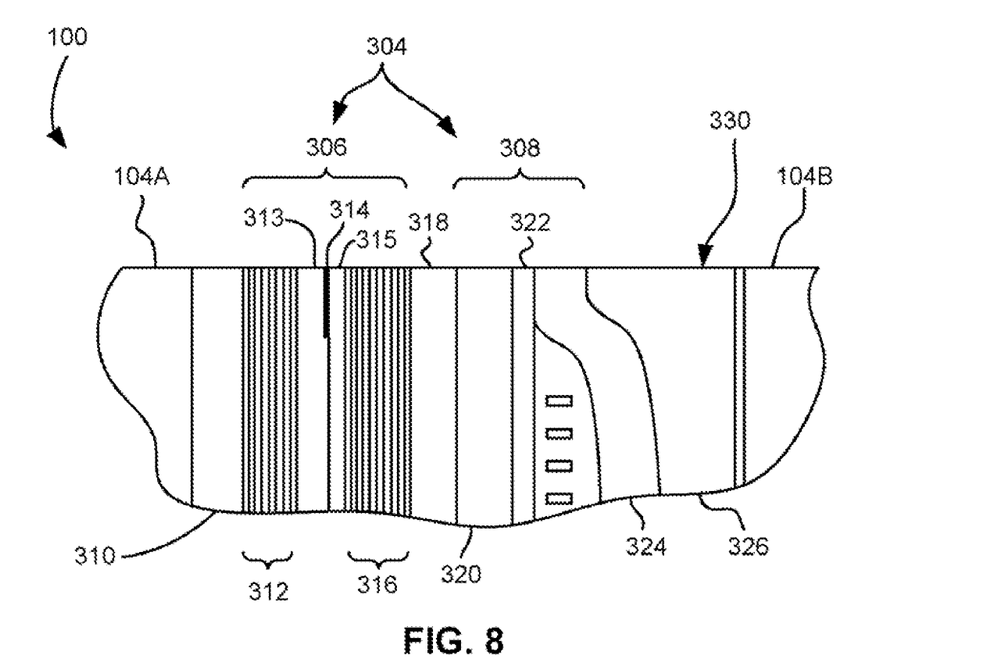
FIG. 8 is a partial cross sectional view of a magnetic head according to one embodiment of the present invention.

FIG. 8 illustrates a magnetic head in which the first shield 312 and the second shield 316 are laminate structures comprising layers of a magnetic material and layers of a nonmagnetic, non-electrically insulative material. An illustrative structure may be as follows: Ta/NiFe/Ta/NiFe/ . . . . NiFe or other magnetic material may be preferable because it does not need to be annealed, as does sendust. In one approach, a thickness of each of the layers of the nonmagnetic, non-electrically insulative material is less than a thickness of each of the layers of the magnetic material. For instance, the thickness of each nonmagnetic, non-electrically insulative layer may be about 100-200 Å, while the thickness of each of the layers of magnetic material may be about 500-700 Å. This maximizes shielding. In another approach, thicknesses of the layers of the magnetic material vary, wherein the thicknesses of the layers of the magnetic material increase towards the sensor to maximize shielding towards the sensor, while maximizing resistance to debris accumulation. Again, variations of this embodiment include designs with only one shield being a laminate structure, only a portion of the shield is a laminate, etc.

In non-laminate embodiments, the nonmagnetic, non-electrically insulative layer 340 is preferably about 50 Å thick or thicker, and preferably in the range of 50 to 300 Å. However, the Ta thickness can be adjusted for optimum results and so may be thicker or thinner. To further minimize the probability of a conductive bridge forming across the various insulation layers, it may be desirable to make the first and/or second insulation layers 313, 315 as thick as processing practice allows, and preferably approximately 300-600 Å.

In embodiments in which the nonmagnetic, non-electrically insulative layer 340 forms part of a laminate structure, thinner nonmagnetic, non-electrically insulative layer s may be more appropriate.

The nonmagnetic, non-electrically insulative layer 340 may have a width that is coextensive with one or more of the adjacent layers, where the width is defined in a direction parallel to the media-proximal surface 330 and the plane of deposition of the respective layer. The height of the nonmagnetic, non-electrically insulative layer 340 may be coextensive with one or more of the adjacent layers, where the height is defined in a direction perpendicular to the media-proximal surface 330. In other approaches, the width and height may be greater or less. For example, the height of the nonmagnetic, non-electrically insulative layer 340 in the embodiment of FIG. 6 is less than coextensive with the adjacent layers.

Figure 9:
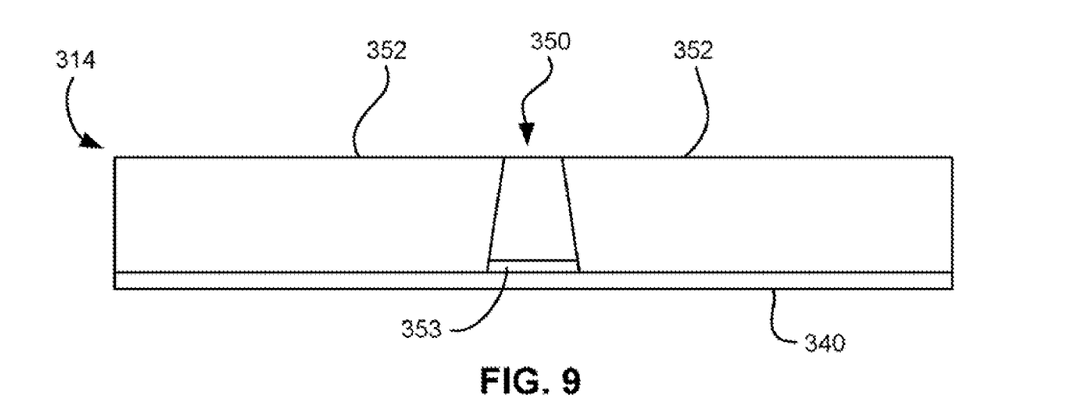
FIG. 9 is a partial tape proximal surface view of a magnetic head according to one embodiment of the present invention.

In other embodiments, the width of the nonmagnetic, non-electrically insulative layer 340 is substantially coextensive with widths of the hard bias layers of the sensor 314 and, optionally, a width of the read transducer. To illustrate, FIG. 9 depicts a sensor 314 comprising a read transducer 350 flanked by hard bias layers 352.

The read transducer 350 may be any known structure. The conventional MR sensor operates on the basis of the anisotropic magnetoresistive (AMR) effect in which an MR element resistance varies as the square of the cosine of the angle between the magnetization in the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a nonmagnetic spacer layer and the accompanying spin-dependent scattering which takes place at the interface of the magnetic and nonmagnetic layers and within the magnetic layers.

Another type of spin valve sensor is an antiparallel (AP)-pinned SV sensor. The AP-pinned SV sensor differs from the simple spin valve sensor in that an AP-pinned structure typically has multiple thin film layers instead of a single pinned layer. The AP-pinned structure has an antiparallel coupling (APC) layer sandwiched between first and second ferromagnetic pinned layers. The first pinned layer has its magnetization oriented in a first direction by exchange coupling to the antiferromagnetic (AFM) pinning layer. The second pinned layer is immediately adjacent to the free layer and is antiparallel exchange coupled to the first pinned layer because of the minimal thickness of the APC layer between the first and second pinned layers. Accordingly, the magnetization of the second pinned layer is oriented in a second direction that is antiparallel to the direction of the magnetization of the first pinned layer. The AP pinned structure is generally preferred over the single pinned layer because the magnetizations of the first and second pinned layers of the AP-pinned structure subtractively combine to provide a net magnetization that is much less than the magnetization of the single pinned layer.

Another type of read transducer 350 is a magnetic tunnel junction (MTJ) device. The MTJ device typically comprises two ferromagnetic layers separated by a thin, electrically insulating, tunnel barrier layer. The tunnel barrier layer is sufficiently thin that quantum-mechanical tunneling of charge carriers occurs between the ferromagnetic layers. The tunneling process is electron spin dependent, which means that the tunneling current across the junction depends on the spin-dependent electronic properties of the ferromagnetic materials and is a function of the relative orientation of the magnetizations of the two ferromagnetic layers. In the MTJ sensor, one ferromagnetic layer has its magnetization fixed, or pinned, and the other ferromagnetic layer has its magnetization free to rotate in response to an external magnetic field from the recording medium (the signal field). When an electric potential is applied between the two ferromagnetic layers, the sensor resistance is a function of the tunneling current across the insulating layer between the ferromagnetic layers. Since the tunneling current that flows perpendicularly through the tunnel barrier layer depends on the relative magnetization directions of the two ferromagnetic layers, recorded data can be read from a magnetic medium because the signal field causes a change of direction of magnetization of the free layer, which in turn causes a change in resistance of the MTJ sensor and a corresponding change in the sensed current or voltage.

The hard bias layers 352 provide longitudinal bias for the free layer of the read transducer 350. The hard bias layers may be formed of conventional materials such as CoPt, CoPtCr, etc.

In current-in-plane configurations, leads may be coupled the hard bias layers 352 to provide electrical connections for sensing the resistance of read transducer 350. The read transducers 350 may also be a current-perpendicular-to-plane design. In either case, one or more electrically insulative layers may be provided to prevent current shunting in some embodiments.

As shown in FIG. 9, the nonmagnetic, non-electrically insulative layer 340 is at least as wide as the widths of the hard bias layers 352. The embodiment shown provides the additional benefit that the nonmagnetic, non-electrically insulative layer 340 may form a seed layer for the hard bias layers 352.

Figure 10:
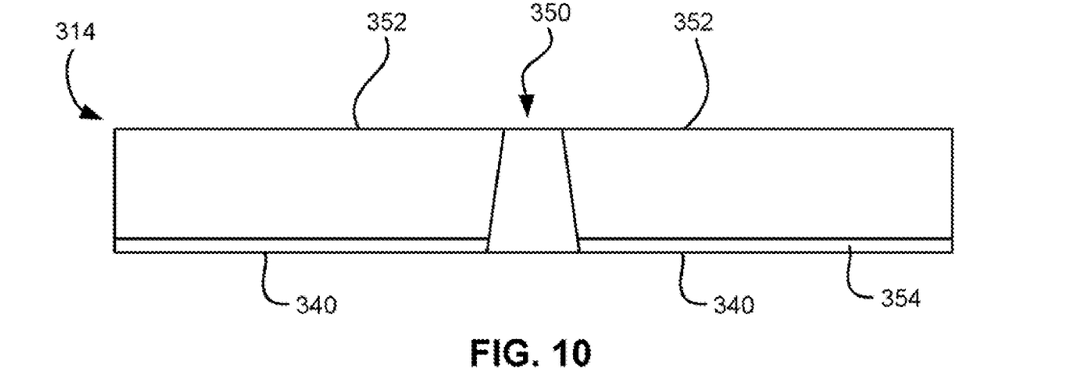
FIG. 10 is a partial tape proximal surface view of a magnetic head according to one embodiment of the present invention.

FIG. 10 depicts a variation in the nonmagnetic, non-electrically insulative layer 340 is at least as wide as the widths of the hard bias layers 352. However, in this embodiment, at least an end 354 of the nonmagnetic, non-electrically insulative layer 340 adjacent the media-proximal surface of the magnetic head is divided into two sections, where each section has a width that is at least substantially coextensive with a width of the hard bias layer closest thereto. As shown, the break in the nonmagnetic, non-electrically insulative layer 340 is generally aligned with the read transducer 350, and which may or may not be coextensive with the track width of the thin film structure forming the read transducer 350. The embodiment shown provides the additional benefit that the nonmagnetic, non-electrically insulative layer 340 may form a seed layer for the hard bias layers 352, and so can be formed during sensor fabrication. One advantage of this solution is that it does not require post wafer machining or other processes. It does require a masking level and an additional process step during wafer build, but the process is not complex and should not affect wafer yield.

To further minimize formation of conductive bridges on the head, a carbon covering may be formed on the media-proximal surface of the head.

In other embodiments, the materials in the writer poles 320, 324 and/or hard bias layers 352 may be altered to favor the suppression of conductive bridge formation via the same means presented herein.

As alluded to above, a nonmagnetic, non-electrically insulative layer, or laminate thereof, may also be formed in the write gap between the write poles. Accordingly, the nonmagnetic, non-electrically insulative layer, or laminate thereof, may form part of the write gap, or the entire write gap.

In any of the embodiments presented herein, the various layers may be formed by conventional processes. Sputtering is a preferred mode for forming the nonmagnetic, non-electrically insulative layer(s).

Figure 11:
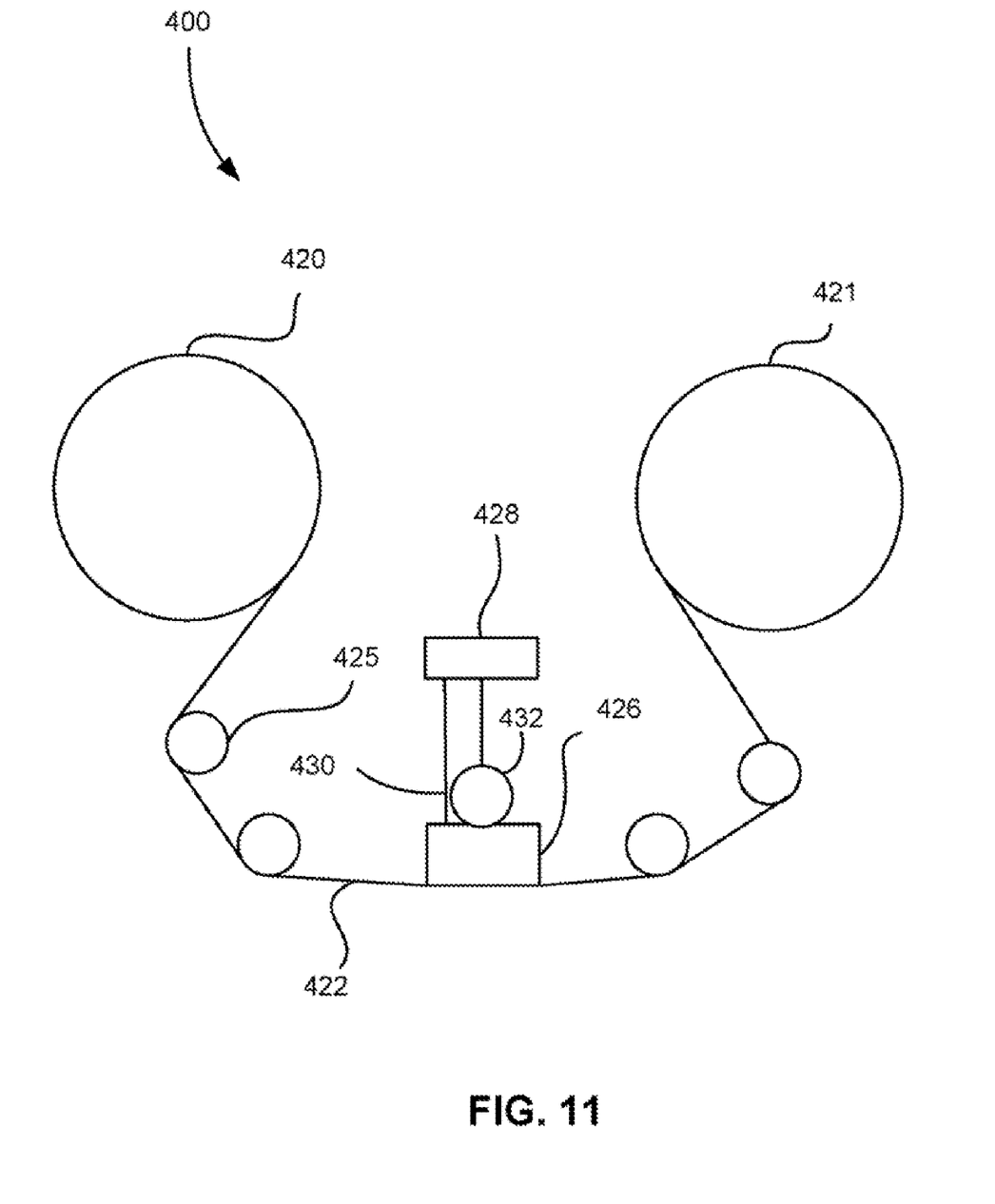
FIG. 11 is a schematic diagram of a tape drive system according to one embodiment of the present invention.

FIG. 11 illustrates a simplified tape drive 400 which may be employed in the context of the present invention. While one specific implementation of a tape drive 400 is shown in FIG. 11, it should be noted that the embodiments of the previous figures may be implemented in the context of any type of tape drive system.

As shown, a tape supply cartridge 420 and a take-up reel 421 are provided to support a tape 422. These may form part of a removable cassette and are not necessarily part of the system. Guides 425 guide the tape 422 across a preferably bidirectional tape head 426, of the type disclosed herein. An actuator 432 controls position of the head 426 relative to the tape 422. The tape head 426 is in turn coupled to a controller assembly 428 via an MR connector cable 430. The controller 428, in turn, controls head functions such as servo following, write bursts, read functions, etc. The controller 428 runs under the control of computer instructions typically in firmware or software run locally or on a host system.

A tape drive, such as that illustrated in FIG. 11, includes drive motor(s) to drive the tape supply cartridge 420 and the take-up reel 421 to move the tape 422 linearly over the head 426. The tape drive also includes a read/write channel to transmit data to the head 426 to be recorded on the tape 422 and to receive data read by the head 426 from the tape 422. An interface is also provided for communication between the tape drive and a host (integral or external) to send and receive the data and for controlling the operation of the tape drive and communicating the status of the tape drive to the host, all as will be understood by those of skill in the art. Examples of a host system include a computer, server, handheld device, etc. in communication with the interface device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
a substrate;
a first shield formed above the substrate;
a sensor formed above the first shield and the substrate;
a second shield formed above the sensor and the substrate;
a first insulation layer positioned between the first shield and the sensor;
a second insulation layer positioned between the sensor and the second shield; and
a nonmagnetic, non-electrically insulative layer formed between at least one of the shields and the sensor, the nonmagnetic, non-electrically insulative layer being laminated between a third insulation layer and the first or second insulation layer.

2. A magnetic head as recited in claim 1, wherein the sensor comprises a read transducer flanked by hard bias layers, wherein the nonmagnetic, non-electrically insulative layer has a width that is substantially coextensive with widths of the hard bias layers of the sensor and a width of the read transducer.

3. A magnetic head as recited in claim 1, wherein the sensor comprises a read transducer flanked by hard bias layers, wherein at least an end of the nonmagnetic, non-electrically insulative layer adjacent a media-proximal surface of the magnetic head is divided into two sections, wherein each section has a width that is at least substantially coextensive with a width of the hard bias layer closest thereto.

4. A magnetic head as recited in claim 3, wherein the nonmagnetic, non-electrically insulative layer is positioned between the first shield and the first insulation layer.

5. A magnetic head as recited in claim 4, wherein the nonmagnetic, non-electrically insulative layer is positioned in at least one recess in the first shield.

6. A magnetic head as recited in claim 3, wherein the nonmagnetic, non-electrically insulative layer is positioned between the sensor and the first insulation layer.

7. A magnetic head as recited in claim 1, wherein the nonmagnetic, non-electrically insulative layer is positioned between the first shield and the first insulation layer.

8. A magnetic head as recited in claim 1, wherein the nonmagnetic, non-electrically insulative layer is positioned between the sensor and the first insulation layer.

9. A magnetic head as recited in claim 1, wherein the nonmagnetic, non-electrically insulative layer is constructed of a substantially pure refractory metal.

10. A magnetic head as recited in claim 1, wherein the nonmagnetic, non-electrically insulative layer is constructed of an alloy of a refractory metal.

11. A magnetic head as recited in claim 1, wherein the nonmagnetic, non-electrically insulative layer, first insulation layer, and the second first insulation layer form a laminate structure.

12. A magnetic head as recited in claim 1, wherein the nonmagnetic, non-electrically insulative layer is at least about 50 Å thick.

13. A magnetic data storage system, comprising:
a magnetic head as recited in claim 1;
a drive mechanism for passing a magnetic recording medium over the head; and
a controller electrically coupled to the magnetic head.

14. A magnetic head as recited in claim 1, further comprising several additional nonmagnetic, non-electrically insulative layers and several additional first insulation layers forming a laminate structure with the nonmagnetic, non-electrically insulative layer.

15. A magnetic head, comprising:
a substrate;
a sensor formed above the substrate;
a second shield formed above the sensor and the substrate;
a first insulation layer positioned between the substrate and the sensor;
a second insulation layer positioned between the sensor and the second shield;
a nonmagnetic, non-electrically insulative layer formed between the substrate and the sensor; and
several additional nonmagnetic, non-electrically insulative layers and several additional first insulation layers forming a laminate structure with the nonmagnetic, non-electrically insulative layer.

16. A magnetic head, comprising:
a substrate;
a sensor formed above the substrate;
a second shield formed above the sensor and the substrate;
a first shield formed between the sensor and substrate; and
a second shield formed above the sensor and substrate,
a first insulation layer positioned between the substrate and the sensor;
a second insulation layer positioned between the sensor and the second shield;
a nonmagnetic, non-electrically insulative layer formed between the substrate and the first insulation layer;
another first insulation layer positioned between the nonmagnetic, non-electrically insulative layer and the sensor,
wherein at least one of the first shield and the second shield is a laminate structure comprising layers of a magnetic material and layers of a nonmagnetic, non-electrically insulative layer.

17. A magnetic head as recited in claim 16, further comprising several additional nonmagnetic, non-electrically insulative layers and several additional first insulation layers forming a laminate structure with the nonmagnetic, non-electrically insulative layer.

18. A magnetic head as recited in claim 16, wherein thicknesses of the layers of the magnetic material vary, wherein the thicknesses of the layers of the magnetic material increase towards the sensor.

* * * * *